United States Patent [19]

Hudspeth et al.

[11] Patent Number: 4,736,215

[45] Date of Patent: Apr. 5, 1988

[54] PHOTOGRAPHIC METHOD AND APPARATUS EMPLOYING AUTOMATIC CAMERA ADJUSTMENT

[75] Inventors: William Hudspeth, Noewell; Frederick Slavitter, Needham, both of Mass.

[73] Assignee: Polaroid Corporation, Cambridge, Mass.

[21] Appl. No.: 69,602

[22] Filed: Jul. 2, 1987

Related U.S. Application Data

[63] Continuation-in-part of Ser. No. 933,150, Nov. 21, 1986, abandoned.

[51] Int. Cl.$^4$ ............................................... G03B 7/24
[52] U.S. Cl. ...................................................... 354/21
[58] Field of Search ........................................ 354/21

[56] References Cited

U.S. PATENT DOCUMENTS

| | | | |
|---|---|---|---|
| 3,593,631 | 7/1971 | Land | 95/10 C |
| 3,631,776 | 1/1972 | Burgarella | 95/10 C |
| 3,672,752 | 6/1972 | Young et al. | 352/72 |
| 3,848,985 | 11/1974 | Bennett | 354/41 |
| 4,120,572 | 10/1978 | Grallert et al. | 352/92 |
| 4,189,228 | 2/1980 | Farrell | 355/41 |
| 4,309,088 | 1/1982 | Uchida et al. | 354/21 |
| 4,349,272 | 9/1982 | Holthusen | 355/69 |

*Primary Examiner*—Michael L. Gellner
*Attorney, Agent, or Firm*—David R. Thornton

[57] ABSTRACT

A photographic method and apparatus in which a camera adapted to receive a film container with at least one light-sensitive film unit and a dark slide protecting the film unit from light prior to insertion of the container into the camera, wherein the dark slide and/or film unit carry machine-readable information corresponding to the value of at least one film variable applicable to the film unit. The camera is equipped with reading means by which the indicia is read while the slide and/or film unit is stationary or during discharge from the camera to provide appropriate camera adjustment under control of signals developed by the reading step. The indicia may be in the form of a magnetic recording medium, in which case, the reading means carried by the camera is a magnetic read head or, alternatively, the indicia may be optically readable by optical scanning means carried by the camera. The indicia may contain both exposure and post-exposure information, and where the reading of the indicia occurs during slide or film advancement, the exposure information is applied to camera operation for the next film unit.

36 Claims, 8 Drawing Sheets

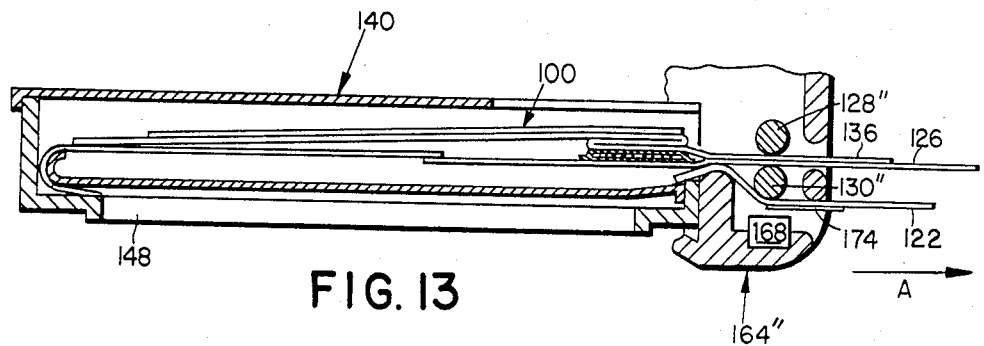

PHOTOGRAPHIC METHOD AND APPARATUS EMPLOYING AUTOMATIC CAMERA ADJUSTMENT

CROSS REFERENCE TO RELATED APPLICATION

This application is a continuation-in-part of copending application Ser. No. 933,150 filed Nov. 21, 1986, now abandoned.

BACKGROUND OF THE INVENTION

This invention relates to photographic methods and apparatus and more particularly, it concerns a method and apparatus for automatically adjusting one or more functions of a photographic camera in accordance with indicia supplied with a container for film units adapted to be exposed in the camera.

It is well known in the photographic art to supply light-sensitive film in cartridges or cassettes capable of direct insertion into a camera and to provide the cartridge or cassette with some form of indicia corresponding to one or more characteristics of the film for cooperation with camera carried indicia responsive means to adjust various camera control functions automatically. U.S. Pat. Nos. 3,595,631 issued to Edwin H. Land, U.S. Pat. No. 3,672,752 issued to R. W. Young et al. and U.S. Pat. No. 3,848,985 issued to Stuart Bennett may be considered exemplary of a large number of prior art disclosures in this area. In the Land patent, for example, a cassette for a plurality of film units adapted for exposure and processing an instant camera is provided with a thermistor capable of effecting automatically exposure compensation for both film speed as well as temperature variation. The Young et al. patent features a coded film cassette in which the indicia is in the nature of a conductive strip or strips carried on the film cassette exterior to adapt both a camera and a projector for density variation of film carried in the cassette. The Bennett patent is typical of many systems in which the indicia is in the nature of an exterior surface formation on a film-carrying cassette and operative to regulate an automatic exposure control system when the cassette is inserted into the camera.

The general idea of providing a film-carrying cassette with some form of camera discernible indicia corresponding to one or more characteristics of the film contained in the cartridge or cassette has and continues to be used effectively for automatic control of camera exposure-parameter adjustment or other adjustments incident to the attainment of a high-quality photograph originating with the cassette-contained film unit or units. The increment of manufacturing expense attributed to the film unit container or cassette per se, however, coupled with the increment of manufacturing costs attributable to modifying the structure of such containers and correlating the insertion of film units into such cassettes leaves room for improvement from the standpoint of cost reduction. In addition, with the development of new films, increased ranges of variables are presented, thus requiring more versatile systems for representation of the cassette-contained film units than can be easily accommodated by variable physical characteristics of the cassette. Also, multiple variables in film, such as film speed, diverse sensitometry, color balance, and the like present a challenge to automatic adjustment of camera functions to accommodate each of such variables.

SUMMARY OF THE INVENTION

In accordance with the present invention, photographic systems in which a container housing at least two discrete, superimposed, opaque sheet units, is insertable as a film pack into a camera or camera back with the uppermost sheet unit functioning to block the entrance of light through at least an exposure opening in the container, such that the top one of the at least two sheet units functionally defines a dark slide while the other of the at least two sheet units defines a film unit. The film pack is adapted for correlation of camera operation with at least one film variable, such as film speed, color balance, sensitometry, or the like by providing indicia on at least one of the sheet units corresponding to a known value of the film variable for the film units packaged in the container, reading the indicia, and adjusting an appropriate operating parameter or function of the camera to account for the read value of the film variable.

In accordance with one embodiment of the present invention where the film pack includes a dark slide and at least one film unit and the camera is capable of retaining operation or function information during the sequential exposure of all of the film units within the film pack, the dark slide is provided with indicia corresponding to a known value of film variable for the at least one film unit packaged with the dark slide in the container. The indicia is read while the dark slide is removed from the container and camera prior to exposure of the at least one film unit. The camera adjusts an appropriate exposure or post exposure parameter or function to account for the read value of the film units packaged with the dark slide and sequentially exposed. The indicia may be carried by the dark slide as a coating of a magnetic recording medium on which the information relative to one or more film variables may be recorded magnetically. In this case, the camera is provided with at least one magnetic head for reading the indicia. Alternatively, the indicia may be printed on the dark slide to be read by an optical scanning device in the camera. Regardless of the form of dark slide indicia and corresponding camera carried reading means, the variable operating parameters or functions of the camera will be adjusted in accordance with information carried by the dark slide for all film units packaged with the dark slide in a particular film container.

In accordance with another embodiment of the present invention where the uppermost film unit may be sacrificed as a dark slide if a partially exposed film pack is removed and later reinserted in the camera, indicia may be carried on each individual film unit as well as on the dark slide. In such an embodiment, the indicia may be carried by either peel-apart or integral type film units. When the information is read during dark slide or film movement, exposure information can only be provided for the next successive film unit while post-exposure information can be directed to the film unit carrying the indicia and/or the next film unit.

In accordance with yet a further embodiment of the present invention a film container is constructed so that a stationary reading head on the camera can read indicia on a film unit prior to exposure of the film unit. When the information is read while the film is stationary, both exposure information and post-exposure information can be directed to the film unit carrying the indicia and/or the next film unit.

A principal object of the present invention is, therefore, to provide an inexpensive and highly versatile system and method for correlating an adjustable camera operating parameter with a known value of one or more film variables applicable to one or more film units carried in a particular film container. Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 13 is a partial cross-section of an alternative embodiment of a camera including a film container with a peel-apart film unit having tab arrangements as shown in FIGS. 9 and 10.

DETAILED DESCRIPTION OF THE PREFERRED EMBODIMENTS

Figure 1:
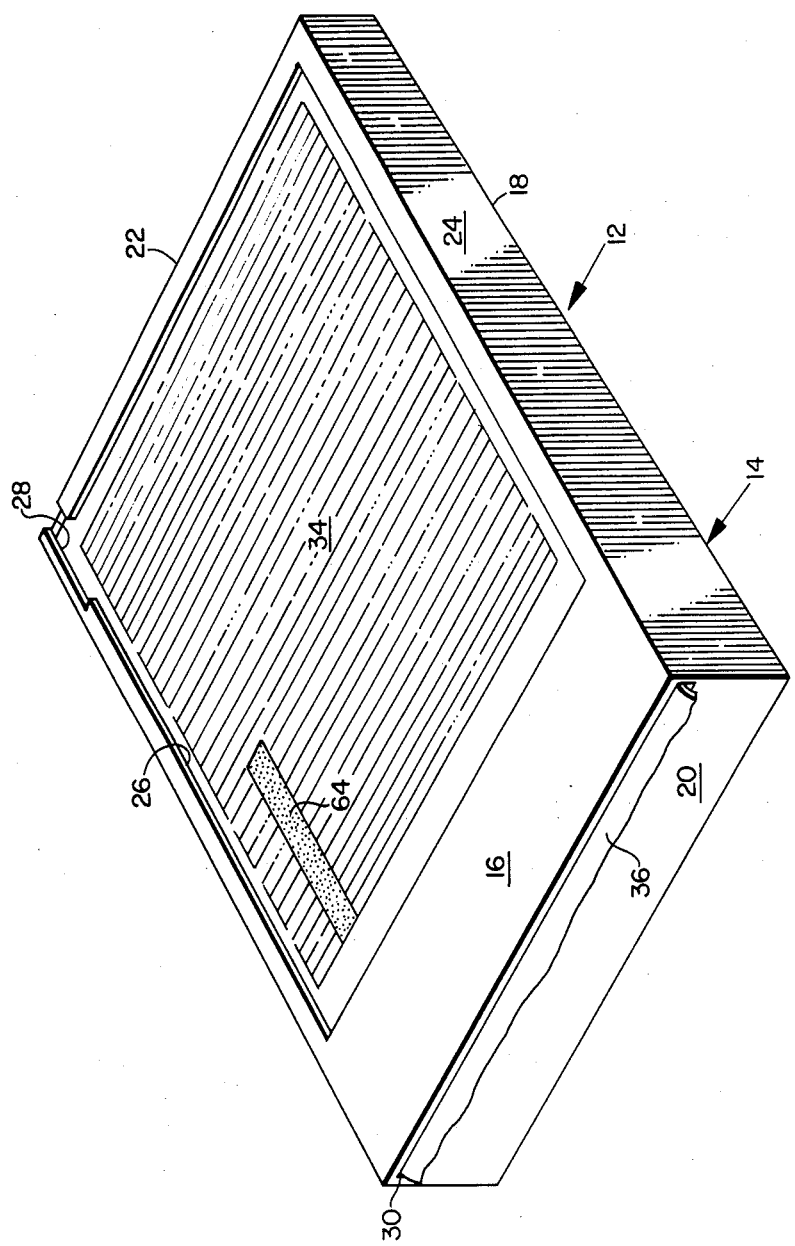
FIG. 1 is a perspective view of a film container incorporating the present invention.
Figure 2:
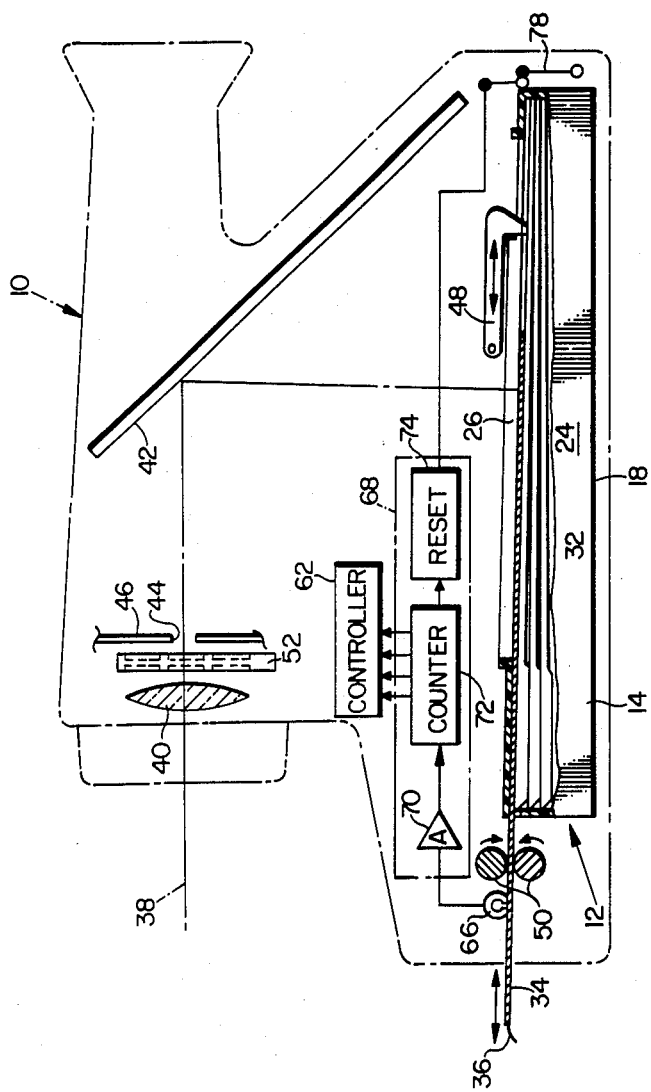
FIG. 2 is a largely schematic longitudinal cross-section of a camera adapted to receive the film container shown in FIG. 1.
Figure 3:
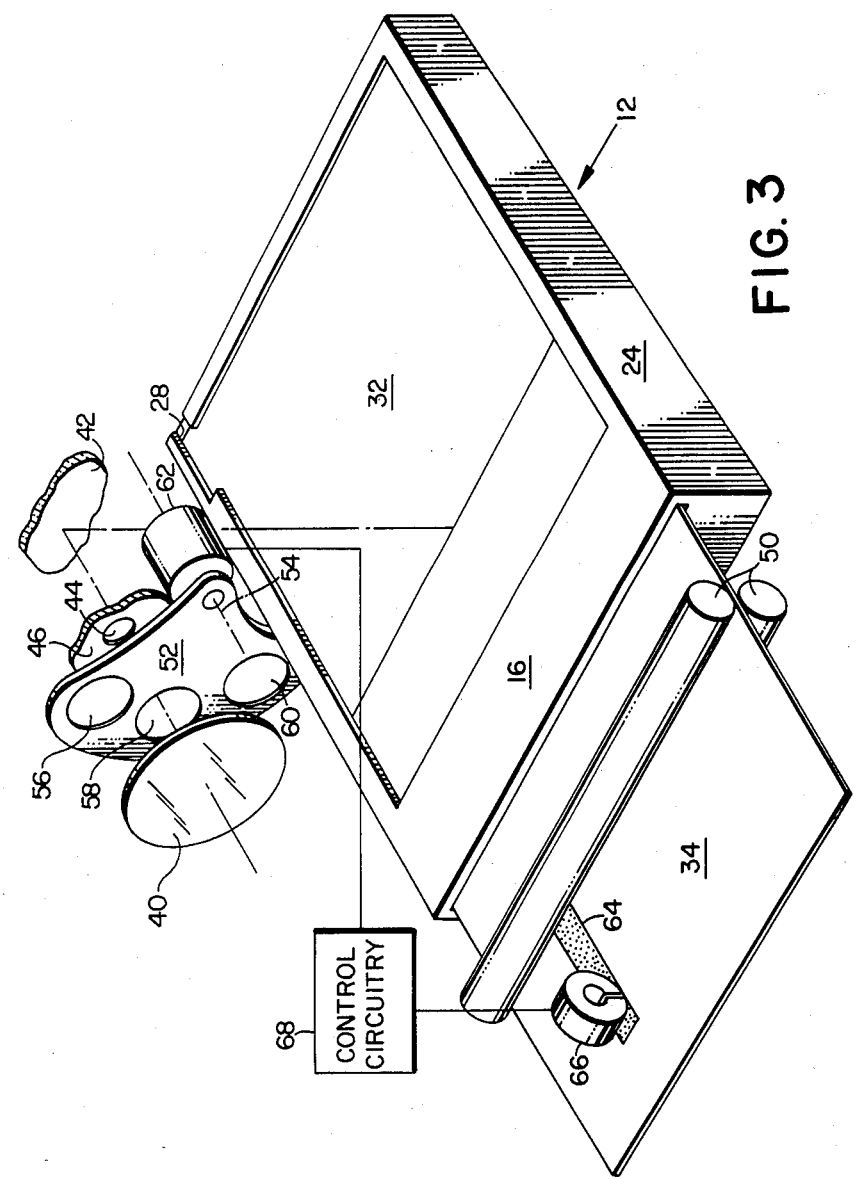
FIG. 3 is a schematic perspective view illustrating an exemplary camera carried adjustable component and system for its adjustment in accordance with indicia carried by a film container dark slide.

In FIGS. 1-3 of the drawings, an exemplary embodiment of the invention is shown in an instant photography system including a camera 10 and a film pack 12 adapted to be received in the camera. Because the general structural organization of the camera 10 and cassette 12 is conventional and well known in the art, much of the camera structure has been omitted from FIGS. 2 and 3 in the interest of more clearly illustrating the novel features of the present invention. For example, the film pack 12 is insertable through a reclosable door assembly (not shown) into a camera defined chamber which, though also not shown, may be assumed as defined by interior camera structure capable of receiving and retaining the film pack 12 in the relative position shown in FIGS. 2 and 3.

The film pack 12 includes a box-like container or cassette 14 having top, bottom, front, back and side walls 16, 18, 20, 22 and 24, respectively. The top wall 16 is open over a substantial portion of its area to define an exposure window 26 joining with a rearwardly disposed pick slot 28. The front wall 20 is provided with a film unit discharge slot 30 near its upper edge and extending across the width of the front wall 20 between the side walls 24. The container 14 is adapted to receive a plurality of film units 32 (FIG. 2) which are loaded by follower spring (not shown) in a manner to be biased upwardly against the underside of the top wall 16. Each of the film units also conventionally include an upwardly facing light-sensitive surface to be presented at the exposure window 26.

To provide a light-tight enclosure for the film units 32 in conjunction with the container 14, the film units 32 are initially packaged with a dark slide 34 sandwiched between the uppermost one of the originally packaged film units 32 and the underside of the top wall 16. The dark slide 34 is opaque, typically formed from a cardboard-like material, and is of a generally rectangular configuration to be coextensive with the film units 32. An opaque leaf-like tab 36 projects from the front edge of the dark slide through the slot 20 to prevent entrance of light to the container interior with the dark slide in place. The principal function of the dark slide, of course, is to act as a closure for the exposure window 26 during the time between packaging the film units 32 in the container 14 and insertion of the film pack 12 into the camera 10.

As thus described, the film pack 12 is conventional and readily available commercially under the trade designation "Polaroid SX-70 Land Film." Also in this context, the conventional or known procedure for exposing and processing the film units 32 in the camera 10 may be appreciated by reference to FIG. 2 of the drawings. Specifically, with the film pack 12 in position as shown in FIG. 2, the exposure window 26 is presented on the objective axis 38 which is folded as a result of its definition by an objective lens 40 and a mirror 42. The camera 10 is conventionally equipped with a lens aperture stop 44 typically defined by a shutter 46. Upon actuation of the shutter 46, a pick 48 reciprocates in the pick slot 28 of the film pack 12 to advance the uppermost sheet presented at the exposure window 26 forwardly to the nip of a pair of processing rollers 50. The rollers 50 then advance the uppermost sheet forwardly out of the camera.

When initially loaded into the camera 10, the uppermost sheet presented at the exposure window 26 in the film pack 12 will be the dark slide 34. The dark slide is advanced from the container along its longitudinal length through the slot 30 by movement of the pick 48 and rotation of the rollers 50 so as to be ejected from the camera to present the first film unit 32 at the exposure window 26 for exposure by subsequent actuation of the shutter 46 followed by movement of the pick and the rollers. As is well known in the art, the camera may be equipped with a motor drive for effecting operation of the pick and rollers automatically or the dark slide 34 and film units 32 may be provided with tabs adapted to project forwardly through the front wall 20 of the container 14 for manual withdrawal of the dark slide and film units from the camera 10.

All film units 32 in a given film pack 12 will have the same known value of one or more film variables such as film speed, film color balance, film sensitometry, and the like. To accommodate film units having different values of the respective film variables in the context of assuring proper exposure and/or processing, the camera 10 must be adjustable to expose and/or process each film unit 32 in correspondence to the known values of film variables applicable to the film pack 12 loaded in the camera. For example, variation in film speed must be accounted for by appropriate adjustments of camera shutter speed or aperture stop; variation in film color balance may be accounted for by use of different filters on the objective axis 38; and variation in film sensitometry, at least for self-developing film units of the type represented by the units 32, may be compensated for by adjustment of the nip spacing between the processing rollers 50. Such camera operating adjustments to account for film variables are known in the art. It is equally well known that camera adjustment to accommodate any one of such film variables may be effected automatically by use of some form of electrical or mechanical coding carried by the container of film represented in the illustrated embodiment by the container 14.

In accordance with the present invention, information as to the known value of one or more film variables of film units 32 in a given film pack 12 is carried by and essentially in the plane of the dark slide 34 so that as the dark slide 34 is removed from the film pack after the latter has been inserted into the camera, the information carried by the dark slide may be read and used to control one or more camera adjustments incident to proper exposure and/or processing of each film unit in a given film pack 12.

To illustrate an exemplary embodiment of apparatus for practicing the invention, the camera 10 in the illustrated embodiment is shown to include an adjustable filter carrier 52 movable about an axis 54 (FIG. 3) to position any one of three filters 56, 58, and 60 on the objective axis 38 between the lens 40 and the aperture stop 44 in the disclosed embodiment. Movement of the filter carrier 52 on the axis may be effected by a suitable controller such as a stepping motor 62.

In the embodiment of FIGS. 1-3 of the drawings, the dark slide 34 carries an elongated strip of a magnetic recording medium 64 coated or otherwise affixed to the upper surface of the dark slide 34, generally aligned in the direction of slide advancement, and in a position such that as the dark slide is ejected from the camera, as represented in FIGS. 2 and 3, the strip of magnetic recording medium 64 passes under a magnetic read head 66. The information sensed by the read head 66, which may take the form of digital or analog signals, is fed to information processing and control circuitry 68 to effect control of the camera adjusting means, in this instance, the stepping motor 62.

Where the information recorded on the strip 64 of magnetic recording medium carried by the dark slide 34 is in digital form, the control circuitry 68 may take the form depicted in FIG. 2 of the drawings. Specifically, the digital signals originating in the read head 66 are amplified and conditioned by an amplifier and pulse conditioning circuit 70 with the amplified signals fed to a counter 72. The pulses are counted by the counter 72 with the cumulative count presented to the controller or stepping motor 62. When a total of pulses corresponding to the known value of the film variable represented by the dark slide record strip 64 is reached, the filter carrier 52 will be properly positioned. A counter reset 74 may be actuated by suitable means such as a switch 78 actuated upon withdrawal of the container 14 from the camera 10.

Figure 4:
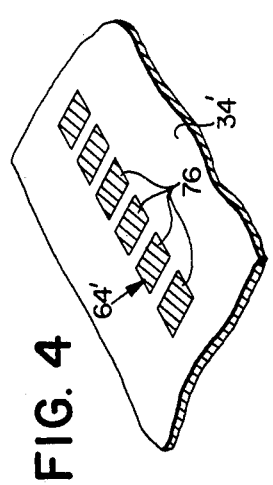
FIG. 4 is a fragmentary perspective view illustrating an alternative format of dark slide carried indicia.
Figure 5:
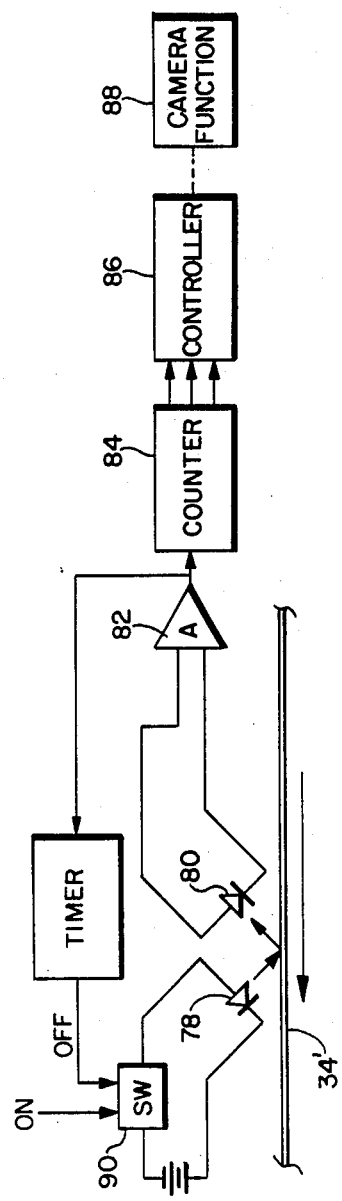
FIG. 5 is a schematic view illustrating a system for reading the indicia illustrated in FIG. 4.

In FIGS. 4 and 5, and alternative embodiment is shown in which the dark slide 34' is provided with an elongated strip 64' (e.g., a bar code) of spaced reflective areas 76, aligned in the direction of slide movement, the number of which will correspond to the known value of a film variable of the units 32 carried in a given film pack 12. As shown in FIG. 5, as the dark slide 34' is discharged from the film pack 12 and the camera 10, the strip 64' will pass under a reading device in the form of a light-emitting photodiode 78 and a light-responsive photosensor 80 such as the illustrated photodiode or other sensors including photocells and phototransistors. The light pulses read by the transistor 80 are fed to an amplifier 82, to a counter 84 so that a controller 86 may be stepped to the proper position for adjustment of the appropriate camera function 88.

The light-emitting diode 78 is in circuit with a switch 90 by which the light-emitting diode is turned on when the film pack 12 is inserted into the camera. When the dark slide 34' is discharged from the film pack 12 and the photosensor 80 generates its first pulse, a timer 92 is actuated to turn off the switch 90 after a predetermined time delay thereby to turn off the light-emitting diode 78 after the strip 64' has passed the optical reading station represented by the diode 78 and photosensor 80. The diode 78 and sensor 80 can be operated in the infrared region for arrangements where visible light could contaminate yet unprocessed film.

In light of the embodiments illustrated in FIGS. 1-5, it will be appreciated that the provision of information on the dark slide of a film pack 12 corresponding to values of film variables entails little more manufacturing cost than printing the dark slide 34 or 34'. Perhaps more importantly, the system of FIGS. 1-5 is easily enlarged to accommodate a plurality of film variables by providing a plurality of information tracks 64 on each dark slide and separate reading means and control circuitry carried by the camera for effecting several camera control functions. On the other hand, in situations where the film pack is removed before, in situations where the film pack is removed before exposure of all of the film units to be later reinserted or when another partially used film pack containing different type film units is to be inserted in the camera, the partially used film pack does not have an indicia carrying dark slide to provide the camera with indicia for the proper adjustment information. A contemplated solution to this problem is the provision of indicia on each film unit in the film pack which has the additional advantage of reducing the memory requirements of the camera or camera back since the indicia information is read off of each film unit.

Figure 6:
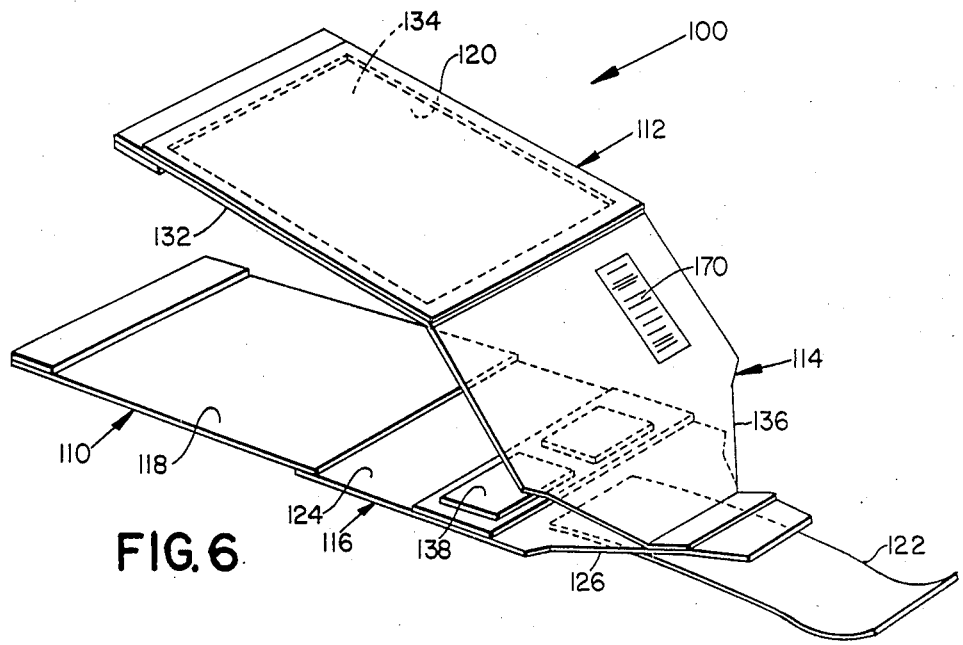
FIGS. 6 and 7 are schematic views illustrating a peel-apart film unit in accordance with alternative embodiments of the present invention.

In FIGS. 6 ∝ 13 of the drawings, other embodiments in accordance with the present invention are shown in an instant photography system wherein the machine readable indicia described previously for the dark slide is similarly applied to each film unit. Since the application to each film unit is wider for peel-apart film rather than integral film, the former is illustrated in these figures. Because the general structural organization of peel-apart film using cameras is conventional and well-known in the art, much of the camera structure has been emitted from FIGS. 11-13 in the interest of more clearly illustrating the novel features of the present invention.

With respect to FIG. 6, a peel-apart film unit 100 includes a negative 110, positive 112 and leaders 114 and 116 interconnecting the negative 110 and positive 112. The negative 110 has an image-receiving coating 118 on one surface and the positive 112 has an image-producing coating 120. A pull tab 122 is releasably attached to the underside of the negative leader 116.

The negative leader 116 includes a pod-holder portion 124 attached to the leading edge of the negative 110, and a pull portion 126 at the end of the leader connected to the pull tab 122. The width of the pull portion 126 is somewhat reduced to facilitate its threading between the bite of the pressure rollers 128, 130; 128', 130' and 128", shown in FIGS. 11-13, respectively.

The positive leader 114 includes a mask portion 132 provided with a rectangular opening 134 for defining the picture area of positive 112. The leader 114 also includes a connector portion 136 by which the positive is connected to the pull portion 126 of the negative leader 116. The lengths of leader portions 124, 126 and 136 are such that as they are drawn from the camera, the coated surfaces 118 and 120 of the negative and positive, respectively, face each other and may be placed in contacting registration so that a latent image on the negative can be transferred to the positive 112 completely filling the area defined by the aperture 134.

The film unit 100 further includes a frangible pod 138 containing processing liquid for effecting the diffusion transfer process between the negative and positive, a skirt 140 on the trailing edge of the mask 132, an extension 142 attached to the trailing edge of the negative 110 and rails 144 attached to the undersurface of the mask 132. The rails 144 cooperate with the skirt 140 and extension 142 to form a reservoir to capture and retain excess processing fluid that would otherwise be extruded at the trailing edge of the film unit 100 as it is withdrawn from a camera.

The film leader 114 of the unit illustrated in FIG. 6 carries machine readable indicia 170 illustrated as a bar code which, like the magnetic indicia 64 of FIG. 1, carries information relating to film type, speed and/or imbibition time, etc. The indica 170, being carried on the leader 114, is read in the camera as film 100 is drawn from the camera as later explained in more detail in regard to FIG. 12.

Figure 7:
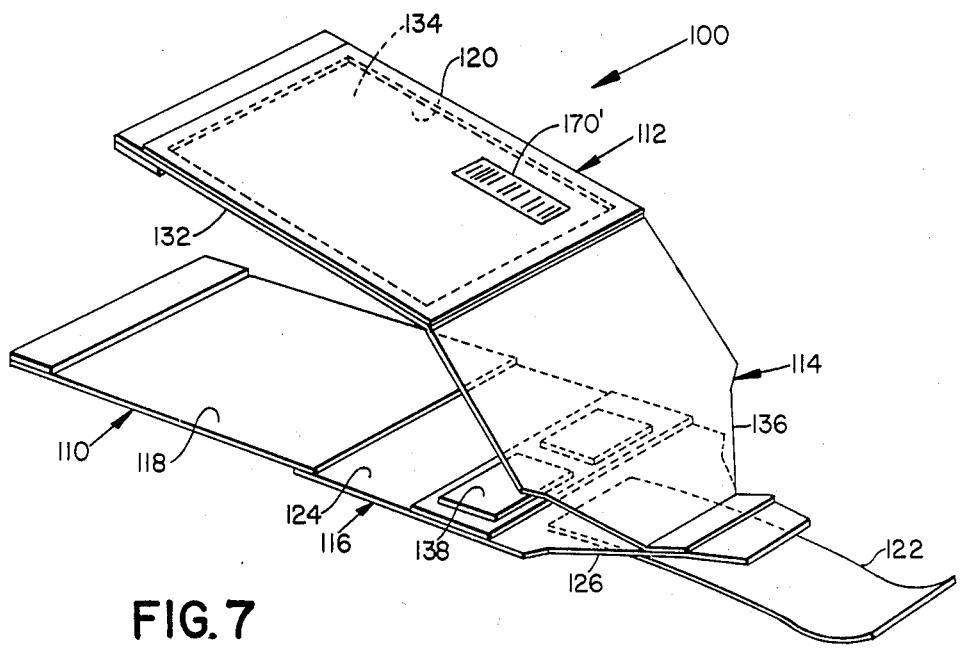

As shown in FIG. 7, the film unit 100 can alternately carry indicia 170' mounted on the positive 112 which is read in the camera as later explained in detail in regard to FIG. 13. Additionally, a bar code 174 or other indicia may alternatively be provided on the pull tab as shown on a pull tab 122' in FIG. 9 and in FIG. 13. This tab indicia may also be provided as a set of apertures 174'.

As shown in FIGS. 8 and 11-13, a container 140 for peel-apart film includes a main housing 142, a top 144 and a pressure plate 146. In the bottom wall of the main housing 142 there is a long rectangular exposure opening 148 (FIG. 11) through which light from the scene being photographed can be focused on the coated surface 118 of the negative 110. The main housing 142 also has an exit opening 150 in the transverse end wall 152 through which a film unit 100' can be withdrawn from the container 140 subsequent to exposure for processing.

More particularly, the side walls of the main housing 142 are provided with spring receiving notches (not shown) into which spring tabs 154 punched from the top 144 extend when the top 144 is in position over the main housing 142. Tabs 154 have considerable length so as to project into the interior of the housing and into engagement with the pressure plate 146.

Further, the top 144 is provided with a relieved portion defined by two rectangular cut-outs 156 that merge with a trapezoidal cut-out 158 adjacent exit opening 150. The top 144 further includes an extension 160 between the cut-outs 156. At the free end of the extension 160 is a block of frictional material 162 such as polyurethane foam. Such a film container is shown in more detail in application Ser. No. 306,384, filed Sept. 3, 1963, now U.S. Pat. No. 3,479,184, issued to Land et al on Nov. 18, 1969.

Figure 8:
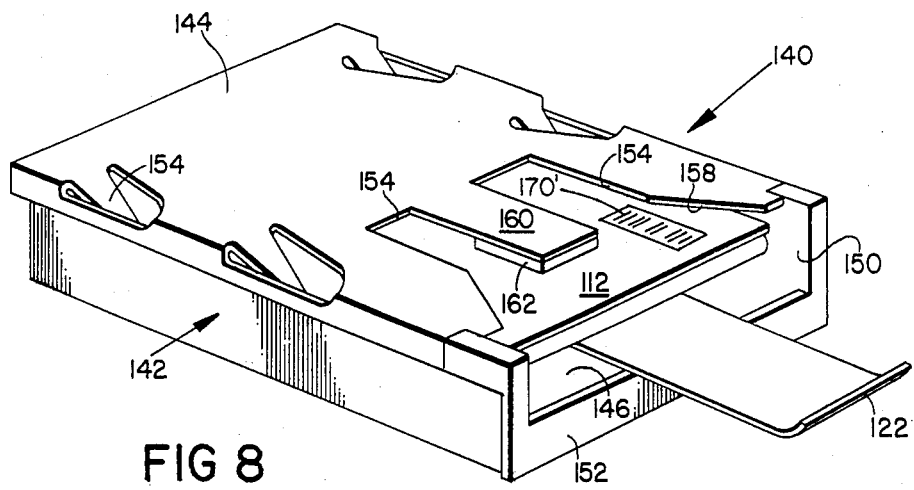
FIG. 8 is a schematic view illustrating a film pack container used with peel-apart film in accordance with the present invention.

As shown in FIG. 8, the indicia 170' illustrated in FIG. 7 will be presented at the cut-out 156 for reading while the positive is stationary or as the positive is manually advanced within the container 140 in the usual manner for peel-apart film following exposure.

Figure 11:
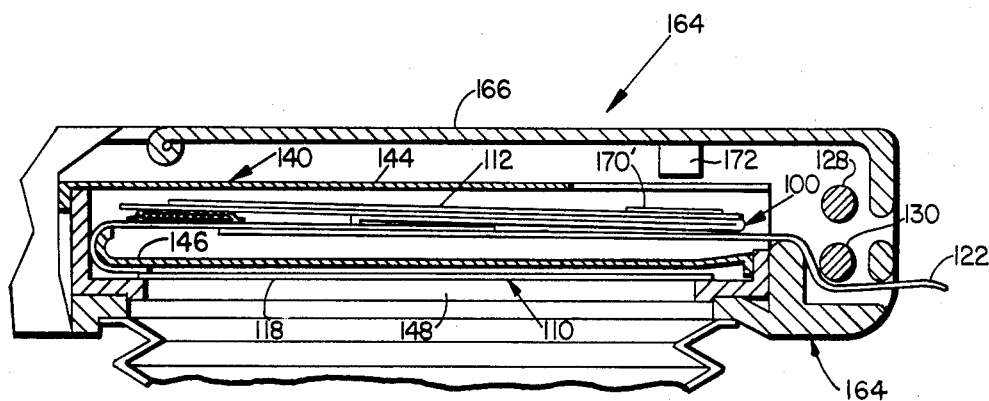
FIG. 11 is a partial cross-section of a camera containing the film container shown in FIG. 8.

Reference is now made to FIG. 11 which shows one embodiment in accordance with the present invention wherein a camera 164 contains the peel-apart film container 140 of FIG. 8 having been inserted through the reclosable door 166. The pull tab 122 extends past the roller 130 in a conventional manner so that a portion of the pull tab protrudes from the camera 164. In its stationary position shown in FIG. 11, the positive 112 has a bar code or recording medium 170' located directly opposite to a bar code scanner or wide angle reading device 172. It will be appreciated that even through a single wide angle read device 172 is shown in FIG. 11, alternatively, while not preferred, a narrow angle reading device which moves relative to the bar code 170' may be used in place of a stationary wide angle reading device. Additionally, a fixed narrow angle reading device could also be utilized to read the bar code indicia 170' as the positive moves during advancement for film processing. For the latter case, the reading device would be mounted in the camera in a leading arrangement to the indicia 170', or that is, to the left of the position of the device 172 in FIG. 11.

The indicia 170' of the embodiment shown in FIG. 11 is scanned by the read device 172 prior to exposure of the negative 110. That is, the reading device 172 scans the bar code or recording medium 170' while the film unit 100 is stationary prior to exposure of the negative 110. Thus, the scanned information from the bar code 170 may include both exposure and post-exposure information for that particular film unit. Such positive bar code information could include exposure information including film sensitivity, color, etc., which are required by the camera prior to exposure and post-exposure information including imbibition time, processing gap, etc.

Figure 12:
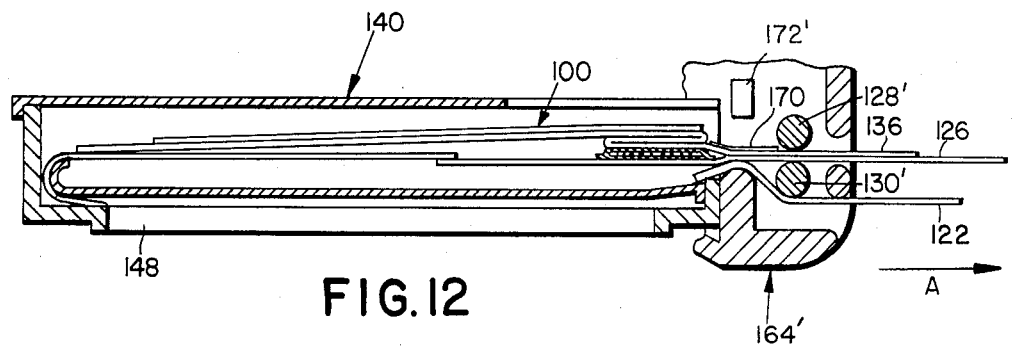
FIG. 12 is a partial cross-section of an alternative embodiment of a camera including a film container with a peel-apart film unit such as shown in FIG. 6.

Even though a single film unit 100 is shown in FIGS. 11 to 13 for the sake of clarity, it is to be understood that the film container 140 will initially enclose a dark slide (not shown) and a plurality of film units 100. In accordance with the present invention, the dark slide and each film unit would be provided with the indicia 170 or 170' so that camera adjustment information is provided in advance of each exposure. The provision of indicia on each film unit allows a film pack or container to be partially used, removed from the camera and later reinserted into the camera, because the next successive film unit has indicia which the camera will read.

The film arrangement of FIG. 6, having indicia 170 carried on the leader portion 186, is shown in FIG. 12 within a camera 164' having a relatively narrow angle reading device 172' located in a position between the peel-apart film container 140 and the roller 128'.

As shown in FIG. 12, following exposure, with the tab 122 pulled in a conventional manner in the direction of the arrow A, the leader portions 126 and 136 are fed to the rollers 128' and 130'.

As the leader portion 136 is drawn between the rollers 128' and 130' as shown in FIG. 12, the bar code indicia 170 passes beneath the stationary reading device 172'. The relative movement between the indicia 170 and the reading device 172' allows the stationary reading device 172' to scan the entire length of the indicia 170. Since the bar indicia 170 is scanned in this embodiment after exposure of the film unit, the scanned information may include post-exposure information such as imbibition time for that particular film unit and exposure information such as film sensitivity for the next film unit in the container. The reading device 172 can also be employed for reading the indicia 170 illustrated in FIG. 7 as the positive passes the reading device during film withdrawal.

The bar code 170 of FIG. 6 may alternatively be located on the back of the negative 118 or on the undersurface of the leader portion 126 connected to the negative of a film unit. However, when the bar code is so located, a reading device for scanning the bar code must be located to one side of the pull tabs and below the ejection path of the film unit rather than above it as shown in FIG. 12.

Additionally, it should be noted that when placement of the indicia is provided as in either FIG. 6 or FIG. 7, the dark slide would also carry identical or at least similar indicia (perhaps with supplemental information) oriented on the dark slide to replicate the position of the film indicia during camera operation. Further similar arrangements may be provided for the integral film. Thus, the indicia 64 of FIG. 1, provided on the dark slide 34, could be located over the pod area (not shown) of the integral film, with each film carrying similarly oriented indicia. Then the dark slide and each film unit would be read as they are advanced from the film cassette. For integral film, the indicia may be carried on the upper or lower surface of the pod or trap area, or on the opaque base of the film unit. Since there is very little longitudinal room in the pod or trap area, several reading heads or one wide angle reading head would be used to read information carried transversely across the pod or trap. Preferably, however, the indicia is oriented longitudinally on the film unit. Thus, the indicia may be located in a variety of alternate positions on either type of film units to be read either by a moving reading head or by a fixed head during film movement, and the indicia can carry exposure and post-exposure information for itself where stationary reading is employed, and exposure information for the next film unit where film advancement is employed.

For integral film, a small cut-out may be provided in the cassette body overlying indicia in the pod margin of the film unit so that each film unit may be read in the camera when stationary prior to exposure. For stationary reading, indicia need not be provided on the dark slide, unless the information on each unit is intended to control operations for the next subsequent unit.

Figure 9:
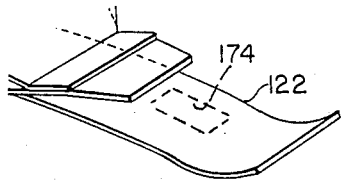
FIGS. 9 and 10 are views of the pull tabs of peel-apart film in accordance with alternative embodiments of the present invention.
Figure 10:
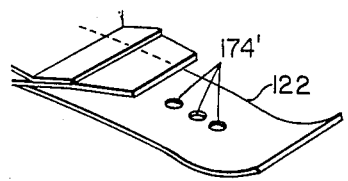

As previously noted, the machine readable indicia may alternately be carried on the peel-apart film pull tab as illustrated in FIGS. 9 and 10. Bar code type of indicia 174 shown on tab 122' in FIG. 9 is shown in a camera 164" in FIG. 13. Herein, a reading head or reading device 168 is mounted in adjoining relation to the tab path beneath roller 130" to provide camera controlling information as the tab is manually advanced from the camera.

As illustrated in FIG. 10 on a pull tab 122''', apertures 174' may be utilized rather than a magnetic stripe or optical bar code. For the aperture arrangement, a pass-through sensor system (not shown), i.e., a spaced infrared source and infrared sensor, would be mounted for passage of the tab therebetween.

It should be noted that, in an arrangement similar to that illustrated and described with regard to the camera of FIGS. 1-5, the cameras 164, 164' and 164" of FIGS. 11-13, respectively, carry a microprocessor chip (not shown) on either the camera back or camera body for receiving the information from the reading device and automatically setting the camera exposure value, imbibition time, etc.

In the preferred embodiment, a single indicia strip providing one or more values is carried on one or more of the sheet units of a film pack or cassette. However, more than one strip may alternately be provided where signals representing different variables are to be conveyed to the camera, i.e., different exposure values, etc., or exposure and post-exposure values. For example, both indicia 170 and 170' of FIGS. 6 and 7, respectively, could be provided on the same sheet and read either by differently located reading heads or the single head 172' of FIG. 12. Further, it should be noted that while the exposure value or camera setting for the next film sheet must be retained by the camera until that exposure (which may be a long period of time) post-exposure information or adjustment may be immediately utilized. Thus, for an exposure value reading made after an exposure, the camera may be mechanically or electrically adjusted or the setting maintained in an electronic memory. For post-exposure information such as imbibition time, a down counter with an audible or visual signal can be set and started in response to the reading of the information.

Thus, it will be appreciated that as a result of the invention, a highly effective system is provided for camera adjustment to accommodate different film variables and by which the principal objective among others is completely fulfilled. Also, it will be apparent to those skilled in the art and it is contemplated that variations and/or changes in the embodiments illustrated and described herein may be made without departure from the present invention. Accordingly, it is intended that the foregoing description is illustrative only, not limiting, and that the true spirit and scope of the present invention will be determined by reference to the appended claims.

What is claimed is:

1. A method of adjusting a camera in accordance with the value of at least one film variable applicable to a film unit packaged with a dark slide for insertion as a film pack into the camera, said method comprising the steps of:
   providing the dark slide with indicia corresponding to the value of a film variable applicable to the film unit packaged with the dark slide;
   discharging said dark slide from the camera to present said film unit for exposure;
   reading said indicia as the dark slide is discharged; and
   adjusting the camera under the control of signals developed by said reading step.

2. Photographic apparatus comprising:
   a film container enclosing at least one film unit having a light-sensitive surface and a known value of at least one film variable;

a removable dark slide in said container initially positioned to cover said light-sensitive surface of said film unit;

a camera having a chamber to receive said container and to present said light-sensitive surface of said film unit in a position for exposure after removal of said dark slide, and adjustable means for adapting operation of the camera to at least one film variable;

indicia means on said dark slide corresponding to said known value of film variable applicable to said film unit;

means for advancing said dark slide in a given direction from said container;

reading means responsive to said indicia means; and control means actuated by said reading means for adjusting said adjustable means to correspond with the film variable value of said film unit.

3. The apparatus of claim 2 wherein said indicia means comprises a magnetic recording strip aligned on said dark slide in the direction of slide movement, said reading means comprising a magnetic reading head supported by said camera in position to read said magnetic strip.

4. The apparatus of claim 2 wherein said indicia means comprises an optically readable strip aligned on said dark slide in the direction of slide movement, said reading means comprising optical reading means carried by said camera in position to read said optical strip.

5. A film pack for use in a camera configured for receiving a film container, for advancing a dark slide from said container, for reading information on said dark slide during advancement and for adjusting the camera in accordance therewith, said film pack comprising:

a film container having a given opening;

at least one film unit mounted within said container, said film unit having a light sensitive surface and a known value of at least one film variable; and a removable dark slide mounted in said container in blocking relation to said container opening, said dark slide carrying machine readable indicia corresponding to the value of said film variable, whereby upon removal of said dark slide within said camera, said indicia is read by the camera and the latter adjusted accordingly.

6. The invention of claim 5 wherein said indicia means comprises a magnetic recording strip aligned on said dark slide in the direction of slide movement.

7. The invention of claim 5 wherein said indicia means comprises an optically readable strip aligned on said dark slide in the direction of slide movement.

8. A camera for use with a film container enclosing at least one film unit having a light sensitive surface and a known value of at least one film variable and a removable dark slide carrying machine readable indicia corresponding to said value of film variable, said camera comprising:

means defining a chamber to receive said container and to present said light-sensitive surface of said film unit in a position for exposure after removal of said dark slide, and adjustable means for adapting operation of the camera to at least one film variable;

means for advancing said dark slide in a given direction from said container;

reading means responsive to said indicia; and control means actuated by said reading means for adjusting said adjustable means to correspond with the film variable value of said film unit.

9. The invention of claim 8 wherein said indicia comprises a magnetic recording strip aligned on said dark slide in the direction of slide movement, and said reading means comprises a magnetic reading head supported by said camera in position to read said magnetic strip as it is advanced from said container.

10. The invention of claim 8 wherein said indicia comprises an optically readable strip aligned on said dark slide in position to read said optical strip, and said reading means comprising optical reading means carried by said camera in position to read said optical strip as it is advanced from said container.

11. A film pack for use with a photographic camera, the camera including means for exposing photographic film presented at an exposure position therein, means for treating exposed film to facilitate production of a viewable image, a reading device for reading machine readable indicia, and adjustable means for adjusting the camera in accordance with said indicia, said film pack comprising:

a container retaining a plurality of sheet units, said container including an opening for advancement of a first and subsequent sheet units in succession from said container; and at least one of said sheet units carrying indicia thereon corresponding to at least one film variable applicable to a sheet unit, said indicia being located on said one sheet unit in position to traverse the reading device of the camera responsive to advancement of said one sheet unit from said container whereby the camera is automatically adjusted for operation in accordance with said at least one film variable.

12. The article of claim 11 wherein at least a portion of said indicia of said one sheet unit corresponds to a film variable pertaining to itself whereby said camera is automatically adjusted for the advancing sheet unit as it is advanced from said container.

13. The article of claim 12 wherein said portion of said indicia corresponds to a film variable applicable to treating of exposed film.

14. The article of claim 13 wherein said portion of said indicia corresponds to the imbibition time applicable to the treating of exposed film.

15. The article of claim 13 wherein at least another portion of said indicia of one sheet unit corresponds to a film variable related to exposure of the next successive sheet unit.

16. The article of claim 11 wherein said container includes an opening through which an adjacent sheet unit may be exposed in the camera, said first sheet unit defines a dark slide in blocking relation to said container opening, and at least a portion of said indicia carried by said dark slide defining sheet unit corresponds to a film variable relating to exposure of the next adjacent sheet unit.

17. The article of claim 11 wherein at least said one sheet unit includes a leader portion and said indicia is located on said leader portion of said one sheet unit.

18. The article of claim 11 wherein said container includes another opening in a wall opposite said exposure opening, said sheet units are stacked within said container with one section thereof arranged for sequential presentation at said exposure opening and another section arranged for synchronous presentation at said another opening and said indicia is located on said another section of said one sheet unit for presentation of said indicia for reading by said camera at said other opening upon advancement of the said one sheet unit.

19. The article of claim 11 wherein each of a number of said sheet units carries indicia corresponding to a film variable in position to traverse the reading head of said camera during advancement of each of said number of sheet units.

20. The article of claim 19 wherein the indicia of each of said number of sheet units corresponds at least in part to an exposure variable applicable to the next successive sheet unit for adjusting the camera for said next successive sheet unit as the preceding sheet unit is advanced.

21. The article of claim 19 wherein the indicia of each of said number of sheet units corresponds at least in part to a post-exposure variable.

22. A film pack for use with a photographic camera, the camera including means for exposing photographic film presented at an exposure position therein, means for treating exposed film to facilitate production of a viewable image, a reading device for reading machine readable indicia, and adjustable means for adjusting the camera in accordance with said indicia, said film pack comprising:
 a container retaining a stack of film sheets, said container including an opening for advancement of a first and subsequent film sheets in succession from said container; and
 a plurality of said film sheets carrying indicia thereon corresponding to at least one film variable applicable to that sheet, said indicia being located on each said plurality of film sheets in position to be read by the reading device of the camera.

23. The film pack of claim 22 wherein said container includes a second opening for presenting the indicia of an adjacent film sheet to the reading device of said camera, and said indicia is located on each of said plurality of film sheets for presentation of each in succession at said second opening for reading by the camera.

24. A camera back for use with a film container enclosing a plurality of sheet units including at least one film unit having a light sensitive surface and a known value of at least one film variable, and at least one of said sheet units carrying machine readable indicia thereon corresponding to said value of film variable, the camera including adjustable means for adapting operation of the camera to at least one film variable, and control means actuatable in accordance with an appropriate signal for adjusting said adjustable means to correspond with the film variable value of the one film unit, the camera back comprising:
 means defining a chamber to receive said container and to present said light-sensitive surface of said film unit in a position for exposure;
 means for defining a path for advancement of the one sheet unit in a given direction along said path from said exposure position; and
 reading means located in said given path for reading said indicia responsive to said advancement, and for producing a signal for said control means in accordance therewith.

25. The invention of claim 24 wherein said indicia comprises a magnetic recording strip aligned on each of a plurality of said sheet units in the direction of unit advancement, and said reading means comprises a magnetic reading head supported by said camera back in position to read said magnetic strip as its associated unit is advanced from said container.

26. The invention of claim 24 wherein said indicia comprises an optically readable strip aligned on each of a plurality of said sheet units in the direction of unit advancement, and said reading means comprising optical reading means carried by said camera back in position to read each said optical strip as its associated unit is advanced from said container.

27. A camera comprising:
 a chamber for enclosing a plurality of sheet units, at least a number of which comprise film units having a light-sensitive surface and a known value of a film variable, at least a first of said sheet units carrying machine readable indicia corresponding to a film variable;
 means for presenting a first of said sheet units at an exposure position and for defining a given path for advancement of said first sheet unit from said exposure position to present the next successive sheet unit at said exposure position;
 a reading device located along said given path for reading said indicia of at least said first sheet unit and for developing a signal corresponding to the film variable represented by said indicia; and
 adjusting means responsive to said signal for adjusting operation of the camera to said at least one film variable represented by said indicia.

28. The article of claim 27 including means for varying the exposure of said film units, and wherein said adjusting means includes means for adjusting said exposure varying means responsive to the signal from said reading device.

29. The article of claim 27 including film treating means for treating each exposed film unit to facilitate production of a viewable image, and wherein said adjusting means includes means for adjusting said film treating means responsive to the signal from said reading device.

30. The article of claim 29 wherein said film treating means comprises means for defining the imbibition period of a film unit, and said adjusting means includes means for setting the timing means for controlling said period defining means to adjust the defined period responsive to the signal from said reading device.

31. A method of adjusting a camera in accordance with the value of at least one film variable applicable to film sheet units inserted as a film pack into the camera for exposure and treatment of each exposed sheet unit in succession, said method comprising the steps of:
 providing a first of said sheet units with machine readable indicia corresponding to at least the value of a film variable applicable to one of the sheet units;
 advancing said first sheet unit within said camera during said exposure and treatment of said first sheet unit;
 reading said indicia responsive to movement of said first sheet unit as it is being advanced so as to develop one or more signals corresponding to the value of the film variable represented by said indicia; and
 adjusting the camera under the control of the signals developed by said reading step.

32. The method of claim 31 wherein said container includes a sheet unit defining a dark slide in light blocking relation to the next successive film unit, and said method further includes:

providing said dark slide with machine readable indicia corresponding to a value of a film variable of the next successive film unit;

advancing said dark slide from said blocking location;

reading said indicia responsive to movement of said dark slide as it is being advanced so as to develop one or more signals corresponding to the value of the film variable represented by said indicia; and adjusting the camera under the control of the signals developed by said reading step to accommodate said next successive sheet unit.

33. The method of claim 32 wherein the step of providing said dark slide with indicia includes providing indicia thereon relating to exposure information for said next successive sheet unit, and providing said next successive film sheet unit with indicia relating to both exposure information for the next subsequent sheet unit and information relating to post-exposure operations for itself.

34. The method of claim 31 wherein the step of providing said first sheet unit with indicia includes providing indicia relating to exposure information for the next successive sheet unit.

35. The method of claim 34 wherein the step of providing said first sheet unit with indicia includes providing additional indicia relating to post-exposure operations.

36. The method of claim 31 wherein the step of providing indicia on said first sheet unit includes providing indicia thereon relating to post-exposure operations.

* * * * *